(12) United States Patent
Raman et al.

(10) Patent No.: US 12,069,475 B2
(45) Date of Patent: *Aug. 20, 2024

(54) METHODS AND SYSTEMS OF HEAD END BASED WIRELESS DEVICE AUTHENTICATION

(71) Applicant: Nile Global, Inc., San Jose, CA (US)

(72) Inventors: Gopal Raman, San Jose, CA (US); Sathish Damodaran, San Jose, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,282

(22) Filed: Apr. 3, 2023

(65) Prior Publication Data
US 2023/0319560 A1    Oct. 5, 2023

Related U.S. Application Data

(63) Continuation of application No. 17/319,031, filed on May 12, 2021, now Pat. No. 11,622,269.

(51) Int. Cl.
*H04W 12/06* (2021.01)
(52) U.S. Cl.
CPC ................... *H04W 12/06* (2013.01)

(58) Field of Classification Search
CPC .............................. H04L 63/10; H04W 64/00
USPC ........................................ 370/235; 709/218
See application file for complete search history.

(56) References Cited

U.S. PATENT DOCUMENTS

| | | | |
|---|---|---|---|
| 9,762,579 B2 | 9/2017 | Sakura et al. | |
| 10,568,060 B2 | 2/2020 | Cattoni et al. | |
| 2006/0293028 A1* | 12/2006 | Gadamsetty | H04L 63/08 455/411 |
| 2012/0252516 A1* | 10/2012 | Miyabayashi | H04W 4/02 455/515 |
| 2016/0036794 A1 | 2/2016 | Adhya et al. | |
| 2017/0033983 A1 | 2/2017 | Caldwell | |
| 2017/0048704 A1* | 2/2017 | McCann | H04W 12/062 |
| 2019/0052603 A1 | 2/2019 | Wu | |
| 2021/0184930 A1 | 6/2021 | Mutnuru et al. | |

* cited by examiner

*Primary Examiner* — Kiet M Doan
(74) *Attorney, Agent, or Firm* — LOZA & LOZA, LLP

(57) ABSTRACT

Embodiments of a device and method are disclosed. In an embodiment, a method of communications involves at a head end (HE), receiving an authentication message from a wireless access point (AP) deployed at a customer site and at the HE, receiving an authentication response from an authentication server in response to the authentication message.

18 Claims, 8 Drawing Sheets

| Client | AP Connection | Authentication ID |
|---|---|---|
| C1 | Conn-2 | ID-1 |
| C2 | Conn-2 | ID-2 |
| C3 | Conn-3 | ID-3 |

Client Table 540

FIG. 5

METHODS AND SYSTEMS OF HEAD END BASED WIRELESS DEVICE AUTHENTICATION

CROSS REFERENCE TO RELATED APPLICATIONS

This application is a continuation of U.S. application Ser. No. 17/319,031, filed on May 12, 2021, the contents of which are incorporated by reference herein.

BACKGROUND

In a wireless network (e.g., a Wi-Fi network), a wireless client can use a corresponding access point (AP) to relay authentication messages. For example, a wireless client (e.g., a wireless sensor) sets up an association to a wireless AP, and after association, the wireless AP acts as a relay for messages between the wireless client and a wireless network. Institute of Electrical and Electronics Engineers (IEEE) 802.1x protocol typically requires a wireless client to authenticate with an authentication server (AS) shortly after association. For example, a wireless client can reach a corresponding AS through a wireless AP, which facilitates client authentication and may be referred to as the authenticator. However, an AP that communicates with a corresponding AS (e.g., a Remote Authentication Dial-In User Service (RADIUS) server) generally needs to be configured with a shared secret that is used by a sender to sign a message so as to assure its integrity. Because the shared secret must be shared with hundreds (even thousands) of APs, it becomes operationally infeasible. In addition, since APs are deployed in hard to secure locations, a shared secret can be tampered with, which allows an attacker to gain knowledge of the shared secret. Once the shared secret is compromised, an attacker can decrypt traffic and/or alter and inject traffic. Therefore, there is a need for authentication technology without the need for distributing authentication credentials to APs that are located in hard to secure locations.

SUMMARY

Embodiments of a device and method are disclosed. In an embodiment, a method of communications involves at a head end (HE), receiving an authentication message from a wireless AP deployed at a customer site and at the HE, receiving an authentication response from an authentication server in response to the authentication message. Other embodiments are also described.

In some embodiments, the method further includes at the HE, extracting a payload from the authentication message and at the HE, encapsulating the payload into an authentication request.

In some embodiments, the method further includes from the HE, transmitting the authentication request to the authentication server.

In some embodiments, the method further includes at the HE, extracting a payload from the authentication message, at the HE, checking a lookup table to identify an identification number that is mapped to a connection between the HE and the wireless AP and a client device connected to the wireless AP from which the authentication message is received, at the HE, encapsulating the payload and the identification number into an authentication request, and from the HE, transmitting the authentication request to the authentication server.

In some embodiments, the method further includes at the HE, extracting a payload from the authentication response and at the HE, encapsulating the payload into an authentication response message.

In some embodiments, the method further includes from the HE, transmitting the authentication response message to the wireless AP.

In some embodiments, the method further includes at the HE, extracting a payload from the authentication response, at the HE, checking a lookup table to map an identification number from the authentication message to a connection between the HE and the wireless AP and a client device connected to the wireless AP, at the HE, encapsulating the payload into an authentication response message, and from the HE, transmitting the authentication response message to the wireless AP through the connection, wherein the authentication response message is forwarded from the wireless AP to the client device.

In some embodiments, the HE is deployed at the customer site.

In some embodiments, the authentication server is deployed remotely to the customer site.

In some embodiments, a communications device includes memory and one or more processors configured to receive an authentication message from a wireless AP deployed at a customer site and receive an authentication response from an authentication server in response to the authentication message.

In some embodiments, the one or more processors are further configured to extract a payload from the authentication message and encapsulate the payload into an authentication request.

In some embodiments, the one or more processors are further configured to transmit the authentication request to the authentication server.

In some embodiments, the one or more processors are further configured to extract a payload from the authentication message, check a lookup table to identify an identification number that is mapped to a connection between the HE and the wireless AP and a client device connected to the wireless AP from which the authentication message is received, encapsulate the payload and the identification number into an authentication request, and transmit the authentication request to the authentication server.

In some embodiments, the one or more processors are further configured to extract a payload from the authentication response and encapsulate the payload into an authentication response message.

In some embodiments, the one or more processors are further configured to transmit the authentication response message to the wireless AP.

In some embodiments, the one or more processors are further configured to extract a payload from the authentication response, check a lookup table to map an identification number from the authentication message to a connection between the HE and the wireless AP and a client device connected to the wireless AP, encapsulate the payload into an authentication response message; and transmit the authentication response message to the wireless AP through the connection, wherein the authentication response message is forwarded from the wireless AP to the client device.

In some embodiments, the HE is deployed at the customer site.

In some embodiments, the authentication server is deployed at the customer site.

In some embodiments, a method of communications involves at an HE deployed remotely to a customer site, receiving an authentication message from a wireless AP deployed at the customer site, wherein the authentication message is transmitted from a wireless client device deployed at the customer site to the wireless AP and at the HE, receiving an authentication response from an authentication server deployed remotely to the customer site in response to the authentication message.

In some embodiments, the method further includes at the HE, extracting a payload from the authentication message, at the HE, checking a lookup table to identify an identification number that is mapped to a connection between the HE and the wireless AP and a client device connected to the wireless AP from which the authentication message is received, at the HE, encapsulating the payload and the identification number into an authentication request, and from the HE, transmitting the authentication request to the authentication server.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 5 depicts a client table that can be used in the communications system depicted in FIG. 4.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
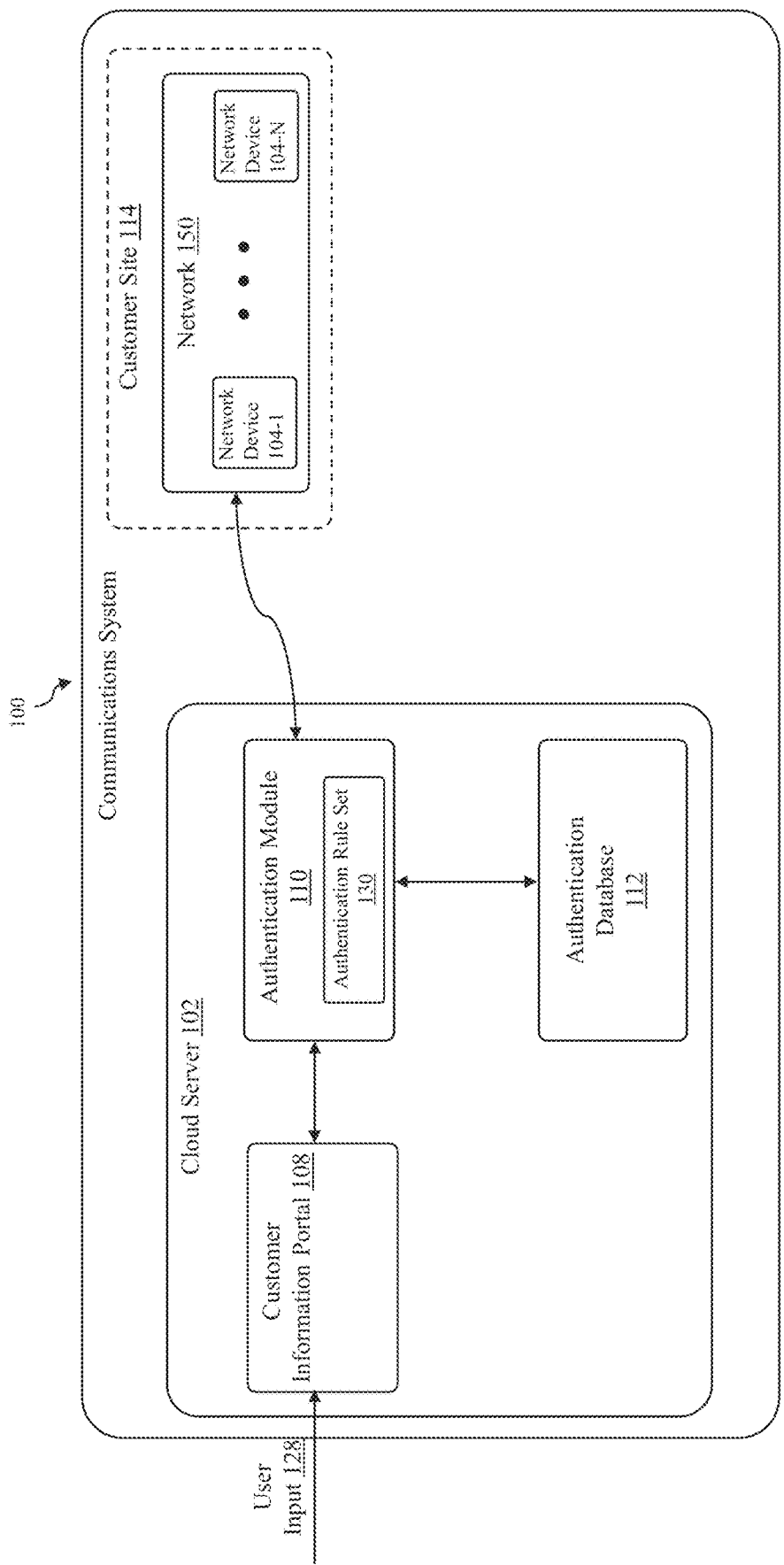
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and a deployed network 150 within a customer site 114. The cloud server and/or the network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a security service (e.g., an authentication service) to network devices (e.g., the deployed network 150) at the customer site. Because the cloud server can facilitate or perform a security service to network devices at the customer site, network security can be improved. In addition, because the cloud server can facilitate or perform a security service to network devices at the customer site, a user or customer of the customer site can be notified of security issues. In some embodiments, the cloud server is configured to generate a user interface to obtain user input information regarding network security in a floor plan of a customer site. In some embodiments, the user interface includes a graphical user interface. The cloud server may be implemented in hardware (e.g., circuits), software, firmware, or a combination thereof. In some embodiments, the cloud server is implemented on a server grade hardware platform, such as an x86 architecture platform. For example, the hardware platform of the cloud server may include conventional components of a computing device, such as one or more processors (e.g., CPUs), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes an authentication module 110, a customer information portal 108 connected to the authentication module 110, and an authentication database 112 configured to store authentication data. The authentication module, the customer information portal, and/or the authentication database may be implemented in hardware (e.g., circuits), software, firmware, or a combination thereof. In some embodiments, the cloud server 102 is a Remote Authentication Dial-In User Service (RADIUS) server. Although the illustrated cloud server is shown with certain components and described with certain functionality herein, other embodiments of the cloud server may include fewer or more components to implement the same, less, or more functionality. For example, in some embodiments, the cloud server includes more than one authentication module, more than one customer information portal, and/or more than one authentication database. In another example, although the authentication module, the customer information portal, and the authentication database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the server. In some embodiments, the authentication module 110 is configured to facilitate or perform an authentication service to network devices (e.g., the deployed network 150) at the customer site 114, for example, using an authentication rule set 130. The authentication rule set 130 may include one or more authentication rules for network devices at the customer site 114, for example, for performing an authentication service to network devices at the customer site 114. In some embodiments, the authentication database 112 is configured to store authentication data for a network deployed and/or to be deployed at the customer site (e.g., a list of network devices deployed or to be deployed at the customer site). Because the authentication module can facilitate or perform an authentication service to network devices at the customer site, network security can be improved. In addition, because the authentication module can facilitate or perform an authentication service to network devices at the customer site, a user or customer (e.g., a layperson such as a worker on-site or an end-user such as an employee) at the customer site can be notified of authentication issues. The customer information portal 108 is configured to receive customer input 128. In some embodiments, the customer information portal is configured to include or generate a user interface that allows a customer to input information associated with an authentication service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a central processing unit (CPU)), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N may be compatible with Institute of Electrical and Electronics Engineers (IEEE) 802.3 protocol and/or one or more wireless local area network (WLAN) communications protocols, such as IEEE 802.11 protocol. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one authentication server, at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a wireless sensor, a laptop, a desktop personal computer (PC), a mobile phone, or other wireless device that supports at least one WLAN communications protocol (e.g., an IEEE 802.11 protocol).

Figure 2:
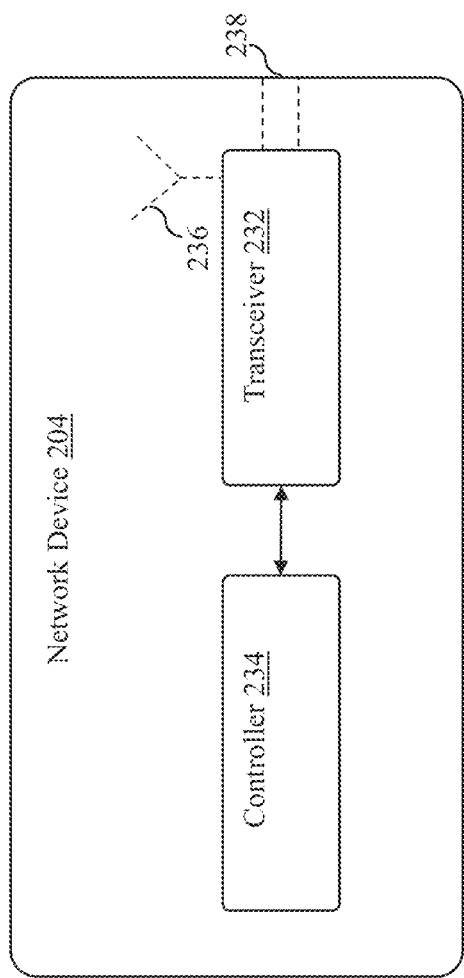
FIG. 2 depicts an embodiment of a network device of the communications system depicted in FIG. 1.

FIG. 2 depicts an embodiment of a network device 204 of the communications system depicted in FIG. 1. The network device 204 may be an embodiment of a network device that is included in the deployed network 150 depicted in FIG. 1. However, network devices that can be included in the deployed network 150 depicted in FIG. 1 are not limited to the embodiment depicted in FIG. 2. The network device 204 may be any suitable type of network device. For example, the network device 204 may be an authentication server, a head end (HE) or gateway, a wireless access point, or a sensor, described in details with reference to FIG. 2. In the embodiment depicted in FIG. 2, a network device 204 includes a wireless and/or wired transceiver 232, a controller 234 operably connected to the transceiver 232, at least one optional antenna 236 operably connected to the transceiver 232, and at least one optional network port 238 operably connected to the transceiver 232. In some embodiments, the transceiver 232 includes a physical layer (PHY) device. The transceiver 232 may be any suitable type of transceiver. For example, the transceiver 232 may be a short-range communications transceiver (e.g., a Bluetooth) or a WLAN transceiver (e.g., a transceiver compatible with an IEEE 802.11 protocol). In some embodiments, the network device 204 includes multiple transceivers, for example, a short-range communications transceiver (e.g., a Bluetooth) and a WLAN transceiver (e.g., a transceiver compatible with an IEEE 802.11 protocol). In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to perform an authentication function for the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a DS, a HE or gateway, an AS, a wireless AP, or a wireless sensor that wirelessly connects to a wireless AP.

Figure 3:
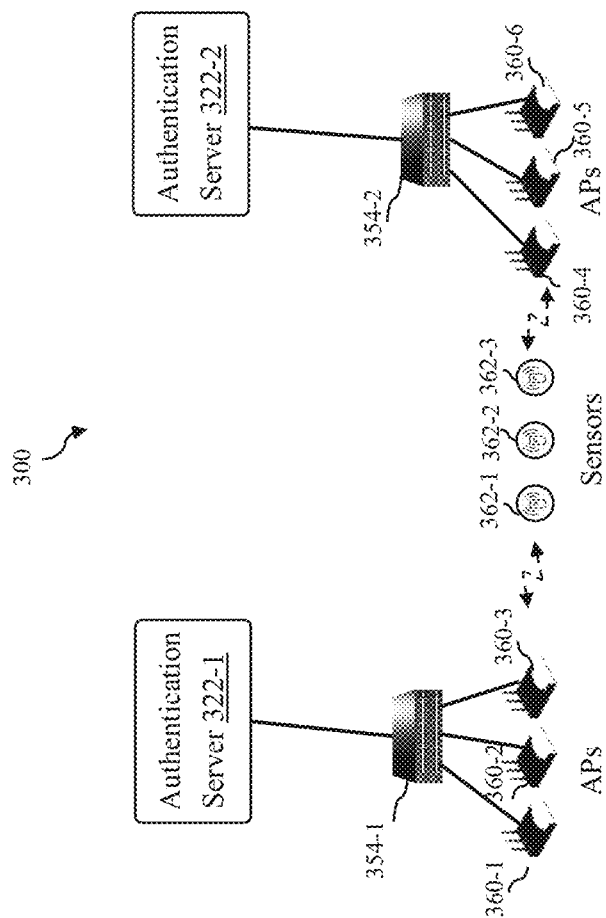
FIG. 3 depicts an embodiment of a communications system in accordance to an embodiment of the invention.

FIG. 3 depicts an embodiment of a communications system 300 in accordance to an embodiment of the invention. The communications system 300 depicted in FIG. 3 is one possible embodiment of the communications system 100 depicted in FIG. 1. However, the communications system 100 depicted in FIG. 1 are not limited to the embodiment shown in FIG. 3. In some embodiments, the communications system includes a replicable block that can be scaled (e.g., expanded) to meet any deployment. In the embodiment depicted in FIG. 3, the communications system includes a pair of authentication servers 322-1, 322-2, a number of head ends (HEs) or gateways 354-1, 354-2 that can interact with lower-level devices (e.g., wireless APs), a number of wireless APs 360-1, 360-2, 360-3, 360-4, 360-5, 360-6 connected to the HEs 354-1, 354-2, and a number of wireless clients, which are implemented as wireless sensors 362-1, 362-2, 362-3 that wirelessly connect to the wireless APs. However, the wireless clients are not limited to wireless sensors and can include a laptop, a desktop PC, a mobile phone, or other wireless device that supports at least one WLAN communications protocol (e.g., an IEEE 802.11 protocol). Each of the authentication servers 322-1, 322-2 and the HEs or gateways 354-1, 354-2 may be located in the customer site 114 or remotely to the customer site 114 (e.g., in a remote data center). For example, at least one of the authentication servers 322-1, 322-2 and the HEs or gateways 354-1, 354-2 may be implemented as the cloud server 102 depicted in FIG. 1.

In the embodiment depicted in FIG. 3, a split-authenticator model is used that moves the authentication (e.g., RADIUS) protocol related parts of the 802.1x authenticator function from each wireless AP 360-1, 360-2, 360-3, 360-4, 360-5, or 360-6 to the HE 354-1 or 354-2. The HE 354-1 or 354-2 can be used as a central entity that functions as a front end to the authentication server 322-1 or 322-2 (e.g., a RADIUS server) while retaining the 802.1x related authenticator functions in the corresponding wireless AP 360-1, 360-2, 360-3, 360-4, 360-5, or 360-6. In some embodiments, at least one of the authentication servers 322-1, 322-2 is a RADIUS server. In these embodiments, the HE 354-1 or 354-2 serves as a RADIUS front end and relays messages between a RADIUS server and a corresponding wireless AP. In some embodiments, the HE 354-1 or 354-2 signs authentication messages (e.g., RADIUS messages) using a shared secret, which can be shared, for example, between the HE 354-1 or 354-2 and the authentication server 322-1 or 322-2 (e.g., a RADIUS server). When an AP acts as a RADIUS client and relays Extensible Authentication Protocol (EAP) messages from a client by encapsulating the EAP messages into RADIUS messages to a RADIUS server, the AP must be configured with a shared secret to assure message integrity. However, because the HE 354-1 or 354-2 can serve as an authentication (e.g., RADIUS) front end and sign authentication messages (e.g., RADIUS messages) using a shared secret, authentication credentials do not have to be distributed to APs that are located in hard to secure locations. Consequently, the problem of deploying 802.1x authentication without the need for distributing authentication credentials to the APs that are located in hard to secure locations can be solved. In some embodiments, cryptographic security measures are implemented between the wireless AP 360-1, 360-2, 360-3, 360-4, 360-5, 360-6 and the HE 354-1 or 354-2 to protect 802.1x messages in the end-to-end path. In some embodiments, at least one of the authentication servers 322-1, 322-2, the HEs 354-1, 354-2, the wireless APs 360-1, 360-2, 360-3, 360-4, 360-5, 360-6, and the wireless sensors 362-1, 362-2, 362-3 depicted in FIG. 3 is implemented as the network device 204 depicted in FIG. 2. In some embodiments, at least one of the authentication servers 322-1, 322-2 is implemented the same as or similar to the cloud server 102 depicted in FIG. 1. For example, at least one of the authentication servers 322-1, 322-2 includes an authentication module and an authentication database configured to store authentication data, which may be implemented in hardware (e.g., circuits), software, firmware, or a combination thereof. In some embodiments, the authentication servers 322-1, 322-2 are configured to facilitate or perform an authentication service to the wireless sensors 362-1, 362-2, 362-3, for example, using an authentication rule set, which may include one or more authentication rules.

In some embodiments, at least one wireless client (e.g., the wireless sensor 362-1, 362-2, or 362-3) is installed in the customer site 114, for example, to monitor the network 150 and perform both active and passive testing of the network 150. For example, at least one wireless sensor checks the health and performance of the wireless network and reports collected data for analysis. In some embodiments, a wireless client (e.g., the wireless sensor 362-1, 362-2, or 362-3) includes a wireless transceiver, a controller operably connected to the wireless transceiver, and at least one antenna operably connected to the wireless transceiver. The wireless transceiver may be any suitable type of transceiver. For example, the wireless transceiver may be a short-range communications transceiver (e.g., a Bluetooth) or a WLAN transceiver (e.g., a transceiver compatible with an IEEE 802.11 protocol). In some embodiments a wireless client (e.g., the wireless sensor 362-1, 362-2, or 362-3) includes multiple wireless transceivers, for example, a short-range communications transceiver (e.g., a Bluetooth) and a WLAN transceiver (e.g., a transceiver compatible with an IEEE 802.11 protocol). In some embodiments, the controller is configured to control the wireless transceiver to process packets received through the antenna and/or to generate outgoing packets to be transmitted through the antenna. In some embodiments, the controller is configured to perform an authentication function. The antenna may be any suitable type of antenna. For example, the antenna may be an induction type antenna such as a loop antenna or any other suitable type of induction type antenna. However, the antenna is not limited to an induction type antenna.

In some embodiments, the HE 354-1 or 354-2 includes memory and one or more processors configured to receive an authentication message from a wireless AP (e.g., a wireless AP 360-1, 360-2, 360-3, 360-4, 360-5, or 360-6) deployed at a customer site (e.g., the customer site 114) and to receive an authentication response from a corresponding authentication server 322-1 or 322-2 in response to the authentication message. In some embodiments, the one or more processors (e.g., one or more microcontrollers, one or more DSPs, and/or one or more CPUs) are configured to execute instructions such as, for example, executable instructions that may be used to perform one or more operations described herein and may be stored in the memory. In some embodiments, the memory is volatile memory used for retrieving programs and processing data. The memory may include, for example, one or more RAM modules. In some embodiments, the one or more processors are further configured to extract a payload from the authentication message and encapsulate the payload into an authentication request. In some embodiments, the one or more processors are further configured to transmit the authentication request to the authentication server. In some embodiments, the one or more processors are further configured to extract a payload from the authentication message, check a lookup table to identify an identification number that is mapped to a connection between the HE and the wireless AP and a client device (e.g., the wireless sensor 362-1, 362-2, or 362-3) connected to the wireless AP from which the authentication message is received, encapsulate the payload and the identification number into an authentication request, and transmit the authentication request to the authentication server. In some embodiments, the one or more processors are further configured to extract a payload from the authentication response and encapsulate the payload into an authentication response message. In some embodiments, the one or more processors are further configured to transmit the authentication response message to the wireless AP. In some embodiments, the one or more processors are further configured to extract a payload from the authentication response, check a lookup table to map an identification number from the authentication message to a connection between the HE and the wireless AP and a client device (e.g., the wireless sensor 362-1, 362-2, or 362-3) connected to the wireless AP, encapsulate the payload into an authentication response message, and transmitting the authentication response message to the wireless AP through the connection, where the authentication response message is forwarded from the wireless AP to the client device.

Figure 4:
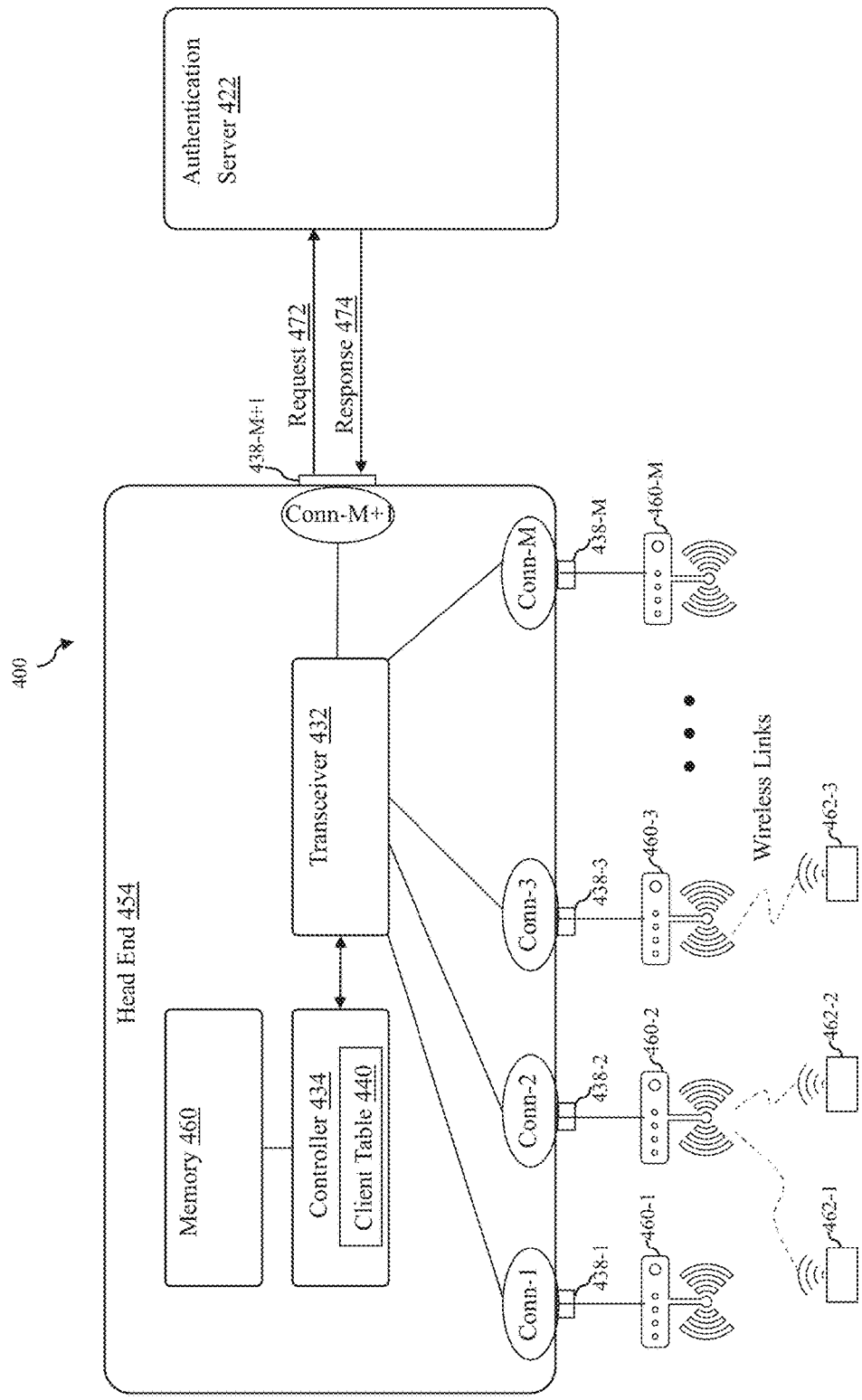
FIG. 4 depicts an embodiment of a communications system in accordance to an embodiment of the invention.

FIG. 4 depicts an embodiment of a communications system 400 in accordance to an embodiment of the invention. The communications system 400 depicted in FIG. 4 is one possible embodiment of the communications system 100 depicted in FIG. 1. However, the communications system 400 depicted in FIG. 1 is not limited to the embodiment shown in FIG. 4. In the embodiment depicted in FIG. 4, the communications system 400 includes an authentication server 422, an HE or gateway 454, a number of wireless APs 460-1, . . . , 460-M (M being a positive integer) connected to the HE 454, and a number of wireless clients 462-1, 462-2, 462-3 that wirelessly connect to the wireless APs. The HE 454 may be an embodiment of the HE 354-1 and/or 354-2 depicted in FIG. 3. However, the HEs 354-1, 354-2 depicted in FIG. 3 are not limited to the embodiment depicted in FIG. 4. The wireless clients may include a wireless sensor, a laptop, a desktop PC, a mobile phone, or other wireless device that supports at least one WLAN communications protocol (e.g., an IEEE 802.11 protocol). In some embodiments, the authentication server 422 is a RADIUS server. In some embodiments, at least one of the authentication server 422, the HE 454, the wireless APs 460-1, . . . , 460-M, and the wireless clients 462-1, 462-2, 462-3 depicted in FIG. 4 is implemented as the network device 204 depicted in FIG. 2. In some embodiments, the authentication server 422 is configured to facilitate or perform an authentication service to the wireless clients 462-1, 462-2, 462-3, for example, using an authentication rule set, which may include one or more authentication rules. The authentication server 422 and/or the HE or gateway 454 may be located in the customer site 114 or remotely to the customer site 114 (e.g., in a remote data center). For example, the authentication server 422 may be implemented as the cloud server 102 depicted in FIG. 1.

In the embodiment depicted in FIG. 4, a split-authenticator model is used that moves the authentication (e.g., RADIUS) protocol related parts of the 802.1x authenticator function from each wireless AP 460-1, . . . , or 460-M to the HE 454. The HE 454 is used as a central entity that functions as a front end to the authentication server 422 (e.g., a RADIUS server) while retaining the 802.1x related authenticator functions in the corresponding wireless AP 460-1, . . . , or 460-M. In some embodiments, the authentication server 422 is a RADIUS server. In these embodiments, the HE serves as a RADIUS front end and relays messages between a RADIUS server (the authentication server 422) and a corresponding wireless AP. In some embodiments, the HE 454 signs authentication messages (e.g., RADIUS messages) using a shared secret, which can be shared, for example, between the HE 454 and the authentication server 422 (e.g., a RADIUS server). When an AP acts as a RADIUS client and relays EAP messages from a client by encapsulating the EAP messages into RADIUS messages to a RADIUS server, the AP must be configured with a shared secret to assure message integrity. However, because the HE 454 can serve as an authentication (e.g., RADIUS) front end and sign all authentication messages (e.g., RADIUS messages) using a shared secret, authentication credentials do not have to be distributed to APs that are located in hard to secure locations. Consequently, the problem of deploying 802.1x authentication without the need for distributing authentication credentials to the AP that are located in hard to secure locations can be solved. In some embodiments, cryptographic security is implemented between the wireless AP 460-1, . . . , or 460-M and the HE 454 to protect 802.1x messages in the end-to-end path. In the embodiment depicted in FIG. 4, the HE 454 includes a transceiver 432 (e.g., a wireless and/or wired transceiver), a controller 434 operably connected to the transceiver 432 and including or storing a client table 440, and a number of network ports 438-1, . . . , 438-M+1, which may be logical ports or physical ports, operably connected to the transceiver 432. The network ports 438-1, . . . , 438-M+1 may be located outside, on, and/or inside the packaging of the HE 454. In some embodiments, the transceiver 432 includes a PHY device. In some embodiments, the network ports 438-1, . . . , 438-M are Transmission Control Protocol (TCP) connections where each TCP connection corresponds to a wireless AP. The transceiver 432 may be any suitable type of transceiver. In some embodiments, the controller 434 is configured to control the transceiver 432 to process packets received through the network ports 438-1, . . . , 438-M+1 and/or to generate outgoing packets to be transmitted through the network ports 438-1, . . . , 438-M+1. In some embodiments, the controller 434 is configured to perform an authentication function for the wireless clients 462-1, 462-2, 462-3. The network ports may be any suitable type of port. For example, the network ports may be LAN network ports such as Ethernet ports. However, the network ports are not limited to LAN network ports. Although the illustrated HE 454 is shown with certain components and described with certain functionality herein, other embodiments of the HE may include fewer or more components to implement the same, less, or more functionality. For example, in some embodiments, the HE includes memory 460, which may be a standalone unit or embedded into another component (e.g., the controller 434) of the HE. In another example, although the components of the HE are shown in FIG. 4 as being connected in certain topology, the topology of the HE is not limited to the topology shown in FIG. 4.

In the embodiment depicted in FIG. 4, four different types of entities, which are the wireless clients 462-1, 462-2, 462-3, the wireless APs 460-1, . . . , 460-M, the HE 454, and the authentication server 422 participate in 802.1x authentication. The wireless clients 462-1, 462-2, 462-3 (e.g., Wi-Fi clients) are the entities that need to be authenticated before being allowed to access the network. The wireless clients 462-1, 462-2, 462-3 associate with the wireless APs 460-1, . . . , 460-M. In the embodiment depicted in FIG. 4, the wireless clients 462-1, 462-2 are associated to the wireless AP 460-2, and the wireless client 462-3 is associated to the wireless AP 460-3. Each wireless AP 460-1, 460-2, 460-3, . . . , or 460-M has a connection, Conn-1, Conn-2, Conn-3, . . . , or Conn-M to the HE 454. In some embodiments, the connections, Conn-1, Conn-2, Conn-3, . . . , Conn-M are TCP connections that originate from the corresponding AP and all the connections Conn-1, Conn-2, Conn-3, . . . , Conn-M are connected to a single network port 438-1, . . . , or 438-M. Each wireless AP sends authentication messages received from one or more of the wireless clients 462-1, 462-2, 462-3 over a specific connection to the HE 454. For example, the wireless AP 460-2 sends authentication messages from the wireless clients 462-1, 462-2 received over the connection, Conn-2, to the HE 454, while the wireless AP 460-3 sends one or more authentication messages from the wireless client 462-3 received over the connection, Conn-3, to the HE. Any authentication responses to a client are also received by a corresponding wireless AP. For example, the wireless AP 460-2 receives authentication responses to the wireless clients 462-1, 462-2 and transmits response data to the wireless clients 462-1, 462-2 over the connection, Conn-2, while the wireless AP 460-3 receives authentication responses to the wireless client 462-3 and transmits response data to the wireless client 462-3 over the connection, Conn-3. The HE 454 acts as a front end to the authentication server 422, which may be a RADIUS server. The HE 454 maintains a client table 440, which can be, for example, contained in the controller 434 or implemented as a standalone unit, contain client data, e.g., a row for each client. In some embodiments, the HE 454 is configured to transmit at least one authentication request 472 and to receive at least one authentication response 474 via a connection Conn-M+1 through the network port, 438-M+1, which may be a logical port, which includes, for example, a User Datagram Protocol (UDP) port pair. For example, the HE 454 transmits an authentication request, REQ (C1, ID-1), and receives an authentication response, RSP(C1, ID-1).

In some embodiments, the HE 454 includes memory 460 and one or more processors (e.g., the controller 434) configured to receive an authentication message from a wireless AP (e.g., a wireless AP APs 460-1, . . . , or 460-M) deployed at a customer site (e.g., the customer site 114) and to receive an authentication response from the authentication server 422 in response to the authentication message. In some embodiments, the one or more processors (e.g., one or more microcontrollers, one or more DSPs, and/or one or more CPUs) are configured to execute instructions such as, for example, executable instructions that may be used to perform one or more operations described herein and may be stored in the memory. In some embodiments, the memory 460 is volatile memory used for retrieving programs and processing data. The memory 460 may include, for example, one or more random access memory (RAM) modules. In some embodiments, the one or more processors are further configured to extract a payload from the authentication message and encapsulate the payload into an authentication request. In some embodiments, the one or more processors are further configured to transmit the authentication request to the authentication server. In some embodiments, the one or more processors are further configured to extract a payload from the authentication message, check a lookup table to identify an identification number that is mapped to a connection between the HE and the wireless AP and a client device (e.g., the wireless client 462-1, 462-2, or 462-3) connected to the wireless AP from which the authentication message is received, encapsulate the payload and the identification number into an authentication request, and transmit the authentication request to the authentication server. In some embodiments, the one or more processors are further configured to extract a payload from the authentication response and encapsulate the payload into an authentication response message. In some embodiments, the one or more processors are further configured to transmit the authentication response message to the wireless AP. In some embodiments, the one or more processors are further configured to extract a payload from the authentication response, check a lookup table to map an identification number from the authentication message to a connection between the HE and the wireless AP and a client device (e.g., the wireless client 462-1, 462-2, or 462-3) connected to the wireless AP, encapsulate the payload into an authentication response message, and transmitting the authentication response message to the wireless AP through the connection, where the authentication response message is forwarded from the wireless AP to the client device.

FIG. 5 depicts a client table 540, which is an embodiment of the client table 440 depicted in FIG. 4. The client table 540 depicted in FIG. 5 is one possible embodiment of the client table 440 depicted in FIG. 4. However, the client table 440 depicted in FIG. 4 is not limited to the embodiment shown in FIG. 5. In the embodiment depicted in FIG. 5, the client table 540 contains three rows of client, AP connection and authentication ID data, 542-1, 542-2, 542-3. The first row 542-1 in the client table 540 shows that client C1 (i.e., the wireless client 462-1) is connected to the HE 454 through connection Conn-2 (i.e., through the wireless AP 460-2) and is associated with an authentication ID of ID-1, the second row 542-2 in the client table 540 shows that client C2 (i.e., the wireless client 462-2) is connected to the HE 454 through connection Conn-2 (i.e., through the wireless AP 460-2) and is associated with an authentication ID of ID-2, and the third row 542-3 in the client table 540 shows that client C3 (i.e., the wireless client 462-3) is connected to the HE 454 through connection Conn-3 (i.e., through the wireless AP 460-3) and is associated with an authentication ID of ID-3. When the HE 454 receives an authentication message from client C1 (i.e., the wireless client 462-1) over the connection Conn-2, the HE 454 extracts a payload (e.g., an EAP payload) from the message. The HE 454 then encapsulates the payload (e.g., the EAP payload) into an authentication request (e.g., a RADIUS request) and sends the authentication request to the authentication server 422 (e.g., a RADIUS server). The HE 454 allocates a unique authentication ID (e.g., a RADIUS ID) for each request message that it stores in the third column 544 of the client table 540. The unique authentication ID (e.g., the RADIUS ID) is carried in authentication request (e.g., a RADIUS request) and response messages. The HE uses the unique authentication ID (e.g., the RADIUS ID) in the response from the authentication server 422 to identify which client sends the corresponding request. For example, according to the client table 540, a RADIUS response with ID-1 is matched with client C1 (i.e., the wireless client 462-1). The HE 454 extracts the EAP payload from the RADIUS response and forwards it to the wireless AP 460-2 over the connection conn-2. In some embodiments, the HE 454 signs all RADIUS messages using a shared secret, which is shared, for example, between the HE 454 and the authentication server 422. In some embodiments, the HE 454 transmits an authentication request, REQ (C1, ID-1), and receives an authentication response, RSP(C1, ID-1).

Figure 6:
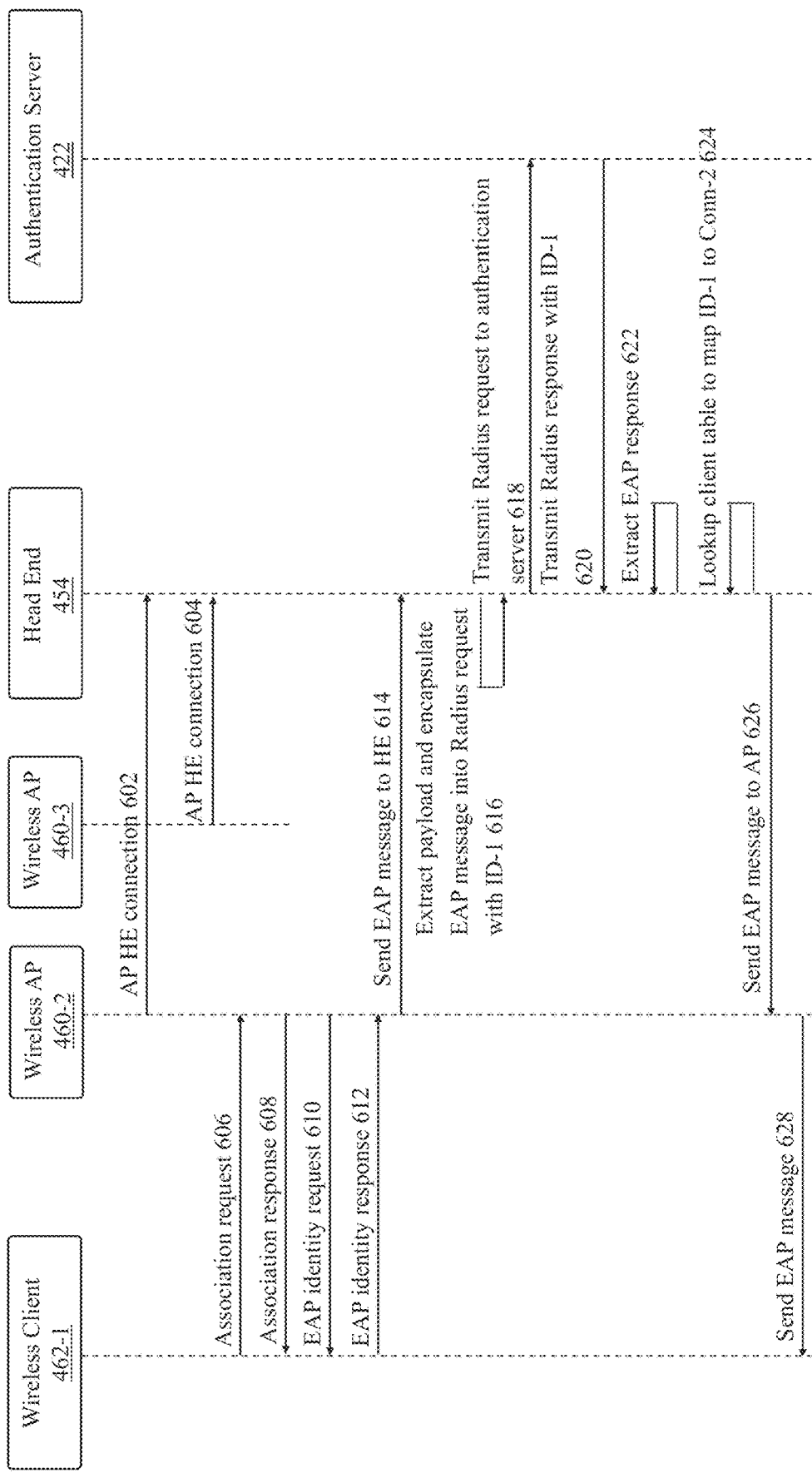
FIG. 6 shows a swim-lane diagram illustrating an example head end based wireless device authentication procedure.

FIG. 6 shows a swim-lane diagram illustrating an example head end based wireless device authentication procedure between the wireless client 462-1, the wireless APs 460-2, 460-3, the HE 454, and the authentication server 422 depicted in FIG. 4. In the authentication procedure depicted in FIG. 6, the HE 454 is used as a central entity that functions as a front end to the authentication server 422 (e.g., a RADIUS server) while retaining the 802.1x related authenticator functions in the corresponding wireless AP 460-1, . . . , or 460-M. Although operations in the example procedure in FIG. 6 are described in a particular order, in some embodiments, the order of the operations in the example procedure may be altered so that certain operations may be performed in an inverse order or so that certain operations may be performed, at least in part, concurrently with other operations.

In operations 602, 604, the wireless APs 460-2, 460-3 setup connections to the HE 454, respectively. In operation 606, the wireless client 462-1 starts off with sending an association request to the wireless AP 460-2 and receives a successful association response in operation 608. An authenticator on the wireless AP 460-2 starts an authentication process (e.g., the EAP authentication process) by sending an EAP identity request in operation 610 and receives an EAP identity response from the wireless client 462-1 in operation 612.

In operation 614, the wireless AP 460-2 forwards the EAP message to the HE 454, for example, over the connection conn-2. In operation 616, the HE 454 extracts the EAP message, allocates a RADIUS request ID-1, and encapsulates the EAP message into a radius request with the RADIUS request ID-1. In operation 618, the HE 454 then transmits the EAP message as the payload of a RADIUS access request message. In operation 620, the authentication server 422, which acts as a RADIUS server, sends a RADIUS response that carries the identifier ID-1. In operation 622, the HE 454 extracts an EAP payload or response from the RADIUS response to the HE 454. In operation 622, the HE 454 looks up the client table 540 to map the response to the wireless client 462-1. The client table 540 indicates that the response should be forwarded to the wireless AP 460-2 over the connection conn-2. In this manner, the response can reach the wireless client 462-1. The rest of the EAP message handshake between the wireless client 462-1 and the authentication server 422 follows a similar path. In operation 626, an EAP message is sent from the HE 454 to the wireless AP 460-2. In operation 628, the EAP message is sent from the wireless AP 460-2 to the wireless client 462-1.

By splitting the authenticator function between the wireless APs AP 460-1, . . . , 460-M and the HE 454, the deployment of 802.1x is simplified and a high degree of security can be maintained. The wireless APs do not initiate or receive RADIUS messages. Consequently, the RADIUS secret only needs to be shared with the HE 454, which keeps the secret safe and makes change management easier. In addition, by splitting the authenticator function between the wireless APs AP 460-1, . . . , 460-M and the HE 454, the EAP messages sent by a wireless client 462-1, 462-2, or 462-3 traverse an extra hop between a wireless AP and the HE 454, which is depicted by the connections conn-1 through conn-3. In some embodiments, these connections are carried over a cryptographically secure channel, which may be setup using Transport Layer Security (TLS) between a wireless AP and the HE. Further, the split-authenticator model also makes it easier to support use cases where there are multiple RADIUS servers, which may be necessary to overcome the performance bottleneck of a single RADIUS server. Under the split-authenticator model, only the HE 454 needs to be configured with information about additional RADIUS servers. On the contrary, in the non-split model, each wireless AP has to be modified every time a new RADIUS server is added or removed.

Figure 7:
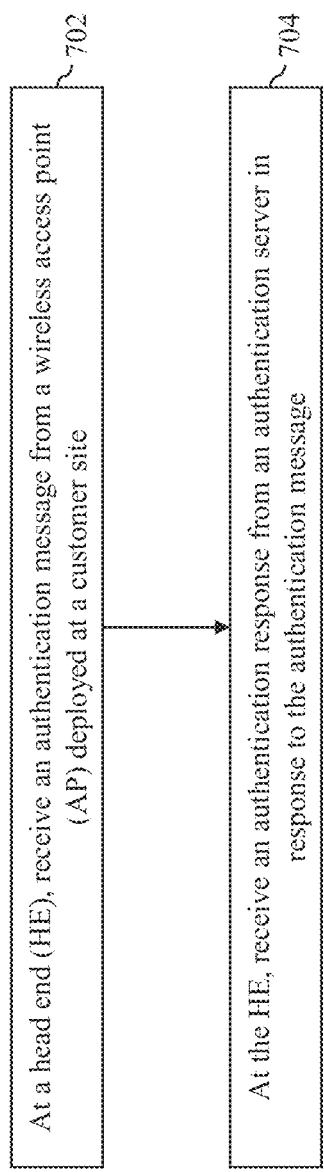
FIG. 7 is a process flow diagram of a method of communications in accordance to an embodiment of the invention.

FIG. 7 is a process flow diagram of a method of communications in accordance to an embodiment of the invention. According to the method, at block 702, at an HE, an authentication message is received from a wireless AP deployed at a customer site. At block 704, at the HE, an authentication response is received from an authentication server in response to the authentication message. In some embodiments, at the HE, a payload is extracted from the authentication message and the payload is encapsulated into an authentication request. In some embodiments, from the HE, the authentication request is transmitted to the authentication server. In some embodiments, at the HE, a payload is extracted from the authentication message, a lookup table is checked to identify an identification number that is mapped to a connection between the HE and the wireless AP and a client device connected to the wireless AP from which the authentication message is received, the payload and the identification number are encapsulated into an authentication request, and the authentication request is transmitted to the authentication server. In some embodiments, at the HE, a payload is extracted from the authentication response and the payload is encapsulated into an authentication response message. In some embodiments, from the HE, the authentication response message is transmitted to the wireless AP. In some embodiments, at the HE, a payload is extracted from the authentication response, a lookup table is checked to map an identification number from the authentication message to a connection between the HE and the wireless AP and a client device connected to the wireless AP, the payload is encapsulated into an authentication response message, and the authentication response message is transmitting to the wireless AP through the connection, where the authentication response message is forwarded from the wireless AP to the client device. In some embodiments, the HE is deployed at the customer site. In some embodiments, the authentication server is deployed at the customer site. The HE may be similar to, the same as, or a component of the HE 354-1, 354-2 depicted in FIG. 3 and/or the HE 454 depicted in FIG. 4. The customer site may be similar to, the same as, or a component of the customer site 114 depicted in FIG. 1. The wireless AP may be similar to, the same as, or a component of the wireless APs 360-1, 360-2, 360-3, 360-4, 360-5, 360-6 depicted in FIG. 3 and/or the wireless APs 460-1, . . . , 460-M depicted in FIG. 4. The authentication server may be similar to, the same as, or a component of the authentication servers 322-1, 322-2 depicted in FIG. 3 and/or the authentication server 422 depicted in FIG. 4.

Figure 8:
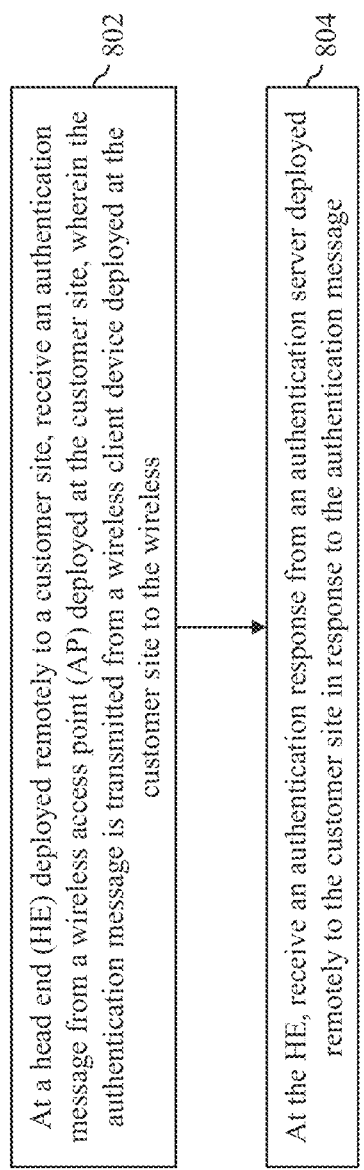
FIG. 8 is a process flow diagram of a method of communications in accordance to an embodiment of the invention.

FIG. 8 is a process flow diagram of a method of communications in accordance to an embodiment of the invention. According to the method, at block 802, at an HE deployed remotely to a customer site, an authentication message is received from a wireless AP deployed at the customer site, where the authentication message is transmitted from a wireless client device deployed at the customer site to the wireless AP. At block 804, at the HE, an authentication response is received from an authentication server deployed remotely to the customer site in response to the authentication message. In some embodiments, at the HE, a payload is extracted from the authentication message, a lookup table is checked to identify an identification number that is mapped to a connection between the HE and the wireless AP and a client device connected to the wireless AP from which the authentication message is received, the payload and the identification number are encapsulated into an authentication request, and authentication request is transmitted to the authentication server. The HE may be similar to, the same as, or a component of the HE 354-1, 354-2 depicted in FIG. 3 and/or the HE 454 depicted in FIG. 4. The customer site may be similar to, the same as, or a component of the customer site 114 depicted in FIG. 1. The wireless AP may be similar to, the same as, or a component of the wireless APs 360-1, 360-2, 360-3, 360-4, 360-5, 360-6 depicted in FIG. 3 and/or the wireless APs 460-1, . . . , 460-M depicted in FIG. 4. The authentication server may be similar to, the same as, or a component of the authentication servers 322-1, 322-2 depicted in FIG. 3 and/or the authentication server 422 depicted in FIG. 4.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
   at a head end (HE), receiving an authentication message from a wireless access point (AP) deployed at a customer site, wherein the HE is deployed at the customer site;
   using the HE, serving as an authentication front end and signing the authentication message using a shared secret between the HE and an authentication server;
   at the HE, extracting a payload from the authentication message;
   at the HE, encapsulating the payload into an authentication request; and
   from the HE, transmitting the authentication request to the authentication server.

2. The method of claim 1, further comprising:
   at the HE, receiving an authentication response from the authentication server in response to the authentication request.

3. The method of claim 1, further comprising:
   at the HE, checking a lookup table to identify an identification number that is mapped to a connection between the HE and the wireless AP and a client device connected to the wireless AP from which the authentication message is received;
   wherein at the HE, encapsulating the payload into the authentication request comprises at the HE, encapsulating the payload and the identification number into the authentication request.

4. The method of claim 1, further comprising:
   at the HE, extracting a second payload from the authentication response; and
   at the HE, encapsulating the second payload into an authentication response message.

5. The method of claim 4, further comprising:
   from the HE, transmitting the authentication response message to the wireless AP.

6. The method of claim 1, further comprising:
   at the HE, extracting a second payload from the authentication response;

at the HE, checking a lookup table to map an identification number from the authentication message to a connection between the HE and the wireless AP and a client device connected to the wireless AP;

at the HE, encapsulating the second payload into an authentication response message; and from the HE, transmitting the authentication response message to the wireless AP through the connection, wherein the authentication response message is forwarded from the wireless AP to the client device.

7. The method of claim 1, wherein the authentication server is deployed remotely to the customer site.

8. A communications device, the communications device comprising:
   memory; and
   one or more processors configured to:
   receive an authentication message from a wireless access point (AP) deployed at a customer site;
   serve as an authentication front end and sign the authentication message using a shared secret between the communications device and an authentication server;
   extract a payload from the authentication message;
   encapsulate the payload into an authentication request; and
   transmit the authentication request to the authentication server,
   wherein the communications device comprises a head end (HE), and wherein the HE is deployed at the customer site.

9. The communications device of claim 8, wherein the one or more processors are further configured to:
   receive an authentication response from the authentication server in response to the authentication request.

10. The communications device of claim 8, wherein the one or more processors are further configured to:
    check a lookup table to identify an identification number that is mapped to a connection between the HE and the wireless AP and a client device connected to the wireless AP from which the authentication message is received; and
    encapsulate the payload and the identification number into the authentication request.

11. The communications device of claim 8, wherein the one or more processors are further configured to:
    extract a second payload from the authentication response; and
    encapsulate the second payload into an authentication response message.

12. The communications device of claim 11, wherein the one or more processors are further configured to transmit the authentication response message to the wireless AP.

13. The communications device of claim 8, wherein the one or more processors are further configured to:
    extract a second payload from the authentication response;
    check a lookup table to map an identification number from the authentication message to a connection between the HE and the wireless AP and a client device connected to the wireless AP;
    encapsulate the second payload into an authentication response message; and
    transmit the authentication response message to the wireless AP through the connection, wherein the authentication response message is forwarded from the wireless AP to the client device.

14. The communications device of claim 8, wherein the authentication server is deployed at the customer site.

15. A method of communications, the method comprising:
    at a head end (HE) deployed at a customer site, receiving an authentication message from a wireless access point (AP) deployed at the customer site;
    using the HE, serving as an authentication front end and signing the authentication message using a shared secret between the HE and an authentication server;
    at the HE, extracting a first payload from the authentication message;
    at the HE, encapsulating the first payload into an authentication request; and
    from the HE, transmitting the authentication request to the authentication server deployed remotely to the customer site; and
    at the HE, receiving an authentication response from the authentication server in response to the authentication request.

16. The method of claim 15, further comprising:
    at the HE, checking a lookup table to identify an identification number that is mapped to a connection between the HE and the wireless AP and a client device connected to the wireless AP from which the authentication message is received;
    wherein at the HE, encapsulating the payload into the authentication request comprises at the HE, encapsulating the payload and the identification number into the authentication request.

17. The method of claim 15, further comprising:
    at the HE, extracting a second payload from the authentication response;
    at the HE, encapsulating the second payload into an authentication response message; and
    from the HE, transmitting the authentication response message to the wireless AP.

18. The method of claim 17, further comprising:
    at the HE, checking a lookup table to map an identification number from the authentication message to a connection between the HE and the wireless AP and a client device connected to the wireless AP; and
    from the HE, transmitting the authentication response message to the wireless AP through the connection, wherein the authentication response message is forwarded from the wireless AP to the client device.

* * * * *